US006834317B2

(12) United States Patent
Chadwell et al.

(10) Patent No.: US 6,834,317 B2
(45) Date of Patent: Dec. 21, 2004

(54) NETWORK TOPOLOGY FOR FOOD SERVICE EQUIPMENT ITEMS

(75) Inventors: Thomas J. Chadwell, San Antonio, TX (US); David C. Sudolcan, Atascosa, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 441 days.

(21) Appl. No.: 09/771,432

(22) Filed: Jan. 26, 2001

(65) Prior Publication Data

US 2004/0015263 A1 Jan. 22, 2004

(51) Int. Cl.[7] ............................ G06F 13/00; G08B 5/22
(52) U.S. Cl. ................................ 710/100; 340/825.36
(58) Field of Search ............................... 710/100, 305; 340/286.09, 286.02, 825.36

(56) References Cited

U.S. PATENT DOCUMENTS 5,739,760 A * 4/1998 Hatakeyama ............... 340/3.32
5,900,801 A * 5/1999 Heagle et al. ............ 340/286.09
6,421,583 B1   7/2002 Sudolcan et al. ............ 700/239

FOREIGN PATENT DOCUMENTS

WO    WO 00/08396    * 2/2000    ............ F25C/5/00

* cited by examiner

*Primary Examiner*—Tim Vo
(74) *Attorney, Agent, or Firm*—Christopher L. Makay

(57) ABSTRACT

A network topology for communication within and between food service equipment items generally comprises one or more food service equipment items, each having a controller and at least one functional subsystem configured as a slave to the controller, and a master interface and a bus slave interface associated with each controller. Each master interface is adapted for electrical communication over an intra-equipment communication channel with a slave interface associated with the functional subsystem. Each bus slave interface is adapted for communication, external to the food service equipment item, over an inter-equipment communication channel. Each bus slave interface is substantially electrically identical to each slave interface.

27 Claims, 8 Drawing Sheets

NETWORK TOPOLOGY FOR FOOD SERVICE EQUIPMENT ITEMS

FIELD OF THE INVENTION

The present invention relates to food service equipment items. More particularly, the invention relates to a network topology specifically adapted for command, control and information communication within and between food service equipment items and between food service equipment items and one or more external application platforms.

BACKGROUND OF THE INVENTION

It is becoming more common in the food service equipment industries to create equipment by interconnecting a set of peripherals to a central computer, such as a microcontroller, through the use of a master-slave network architecture. In the past, the central computer monitors and controls the peripherals associated with the particular system, and may, among other things, collect data relating to the system environment and use.

Unfortunately, the typical master-slave type architecture most commonly used in the food service industries imposes that there be only one master and many slaves, and further imposes that a slave may only be connected to a single master. This prevents the various equipment items employing this architecture from being interconnected such that they may share common resources. Because, however, a common ice making and transport system my provide ice to a cluster of beverage dispensers, it is desirable to connect the beverage dispensers and the ice system through the master-slave network. Due to the previously mentioned limitations of the typical master-slave architecture, this is not possible.

It is also becoming more common in the food service equipment industries to provide a method for providing remote monitoring, reconfiguration and control of individual pieces of equipment. Because such applications normally require redundant and special purpose hardware to support remote monitoring, reconfiguration and control and due to the time required to establish a connection between remote sites and individual pieces of equipment, it has not previously been economically feasible to connect such equipment items to a larger, wide area network, such as the Internet.

It is therefore a primary object of the present invention to improve over the prior art by providing a method whereby only single connection may be utilized to establish connectivity between the food service establishment and the outside world. Further, it is an object of the present invention to provide connectivity in a manner that requires less hardware to connect the various pieces of food service related equipment contained in that establishment. Finally, it is yet another object of the present invention to allow the multiple master-slave networks of these various pieces of food service equipment to be connected to each other in logical groupings such that they may then share the resources of common peripherals.

SUMMARY OF THE INVENTION

In accordance with the foregoing objects, the present invention—a network topology for communication within and between food service equipment items—generally comprises one or more food service equipment items, each having a controller and at least one functional subsystem configured as a slave to the controller, and a master interface and a bus slave interface associated with each controller. Each master interface is adapted for electrical communication over an intra-equipment communication channel with a slave interface associated with the functional subsystem. Each bus slave interface is adapted for communication, external to the food service equipment item, over an inter-equipment communication channel. As a critical aspect of the present invention, in order to enable broad networkability between equipment items, each bus slave interface is substantially electrically identical to each slave interface.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
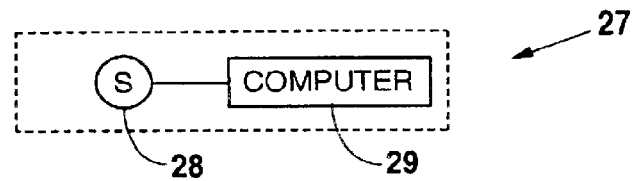
FIG. 1 shows, in a schematic block diagram, a typical slave device as implemented in the present invention.
Figure 2:
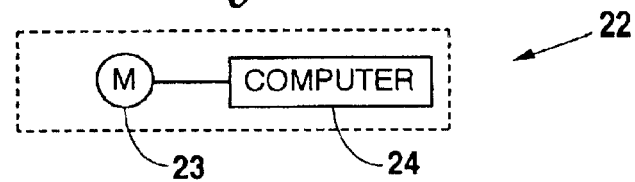
FIG. 2 shows, in a schematic block diagram, a typical master device as implemented in the present invention.
Figure 3:
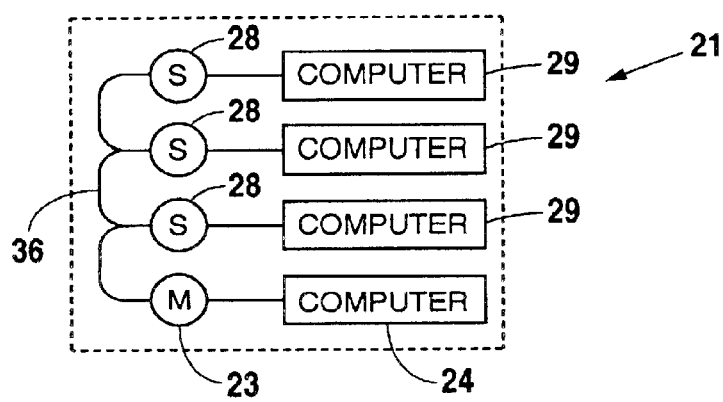
FIG. 3 shows, in a schematic block diagram, a master-slave communication architecture as typically implemented in known food service equipment items.

Referring now to FIGS. 1 through 3, there is shown a master device 22 and a slave device 27 as typically implemented in the master-slave architecture 21 commonly utilized in various food service equipment items 41, such as for example, a frozen yogurt machine 42, an ice cream machine 43, a soft drink dispenser 44, a juice dispenser 45, a soft serve machine 46, a point-of-sale ("POS") terminal 47, a deep fryer 48, a milk shake machine 49, a freezer 50, a refrigerator 51, a grill 52, an ice cream dispenser 53, a combination ice and beverage dispenser 54, a vacuum pneumatic ice conveyance system 55 or the like. As shown in the figures, a typical master device 22 generally comprises a controller 24 having associated therewith a master interface 23. As is known to those of ordinary skill in the art, the controller 24 may comprise a vending machine or mechanism controller 25, such as that specified under the Multi-Drop Bus/Internal Communication Protocol ("MDP/ICP") promulgated by the National Automatic Merchandising Association, or a more specialized device, such as the ice link central processing unit 26, as generally described in PCT international publication No. WO 00/08396, which by this reference is incorporated herein as though now set forth in its entirety.

As also shown in the figures, a typical slave device 27 generally comprises a functional subsystem 29 having associated therewith a slave interface 28. As is known to those of ordinary skill in the art, such a functional subsystem 29 may comprise such devices as a coin acceptor and/or changer 30, a bill validator 31, an audit device 32 or a universal satellite device 33, as specified in the MDB/ICP. Likewise, the functional subsystem 29 may also comprise such devices as the vacuum pump controller 34 or ice diverter 35, as described in PCT international publication No. WO 00/08396. Finally, as particularly shown in FIG. 3, a typical master-slave architecture 21 comprises an intra-equipment communication channel 36 for interface of one and only one master interface 23 with one or more slave interfaces 28.

Figure 4:
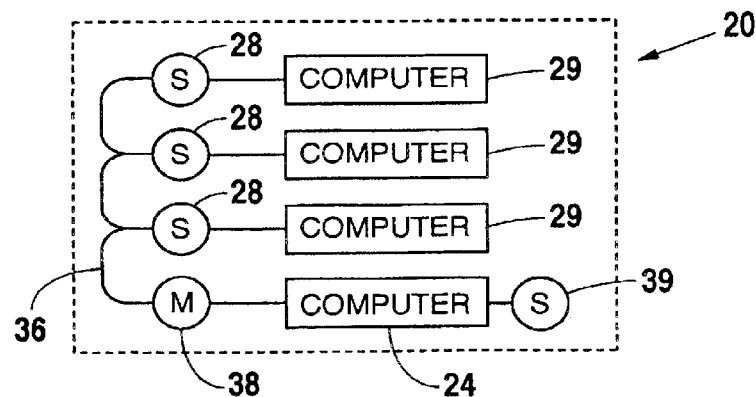
FIG. 4 shows, in a schematic block diagram, a slave-master-slave architecture as forms a basic building block of the present invention.
Figure 5:
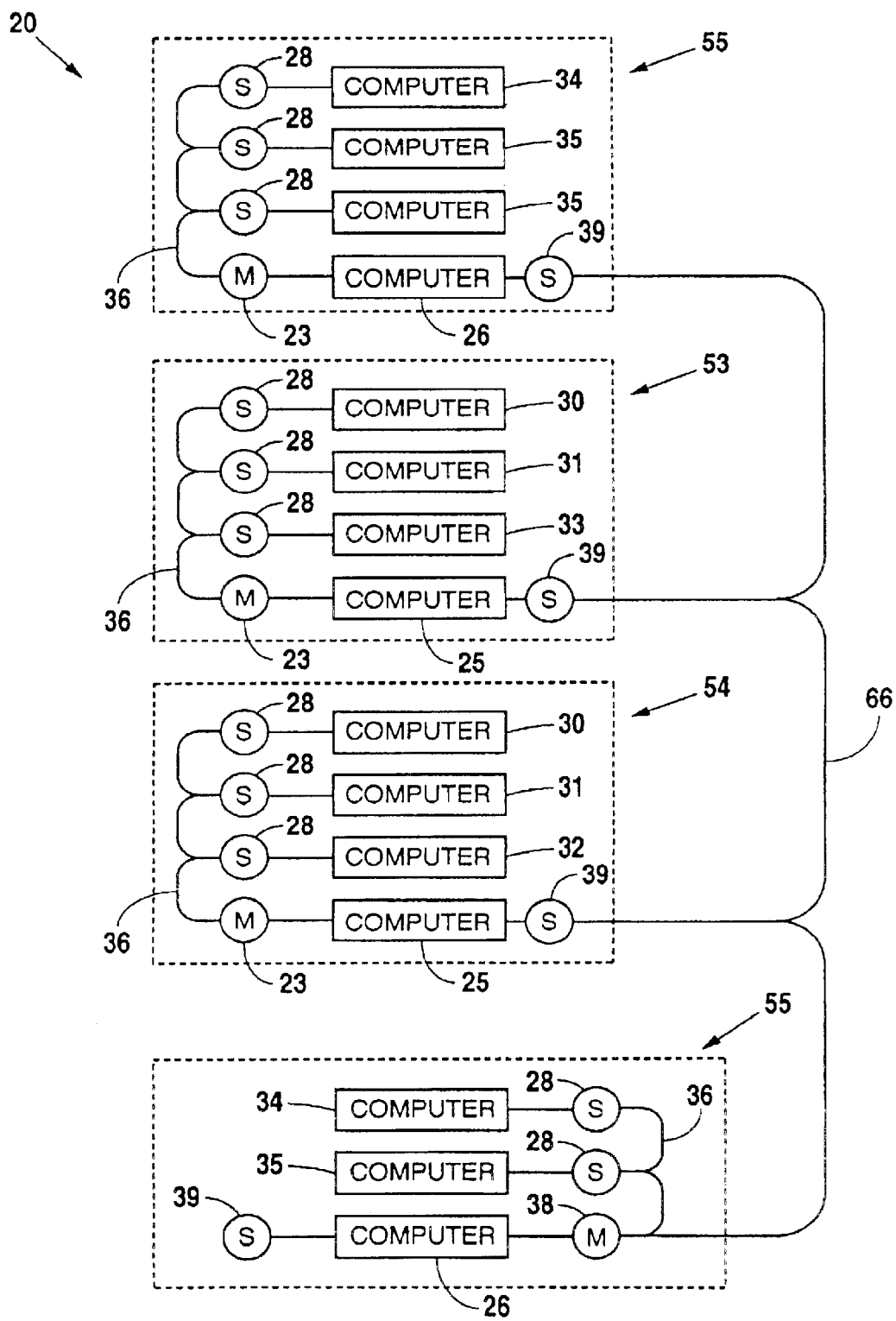
FIG. 5 shows, in a schematic block diagram, a collection of food service equipment items interconnected according to a first preferred embodiment of the network topology of the present invention.

While the master-slave architecture 21 as implemented in previous embodiments of food service equipment items 41 have been limited to a single master interface 23 in association with the controller 24 of the master device 22, the network topology 20 of the present invention improves over the prior art by greatly extending the functionality of the master device 22 through the provision of a bus slave 39 in association with the computer 24. As shown in FIGS. 4 and 5, the master interface 23 of one master device 22 may then serve as a bus master 38 for the control of not only those slave devices 27 connected through the host equipment items intra-equipment communication channel 36 but also may serve as a master device 22 for one or more other food service equipment items 41 connected through an inter-equipment communication channel 66.

As particularly shown in the representation of FIG. 5, this network topology 20, employing the described slave-master-slave architecture 37, enables the sharing of information between related food service equipment items 41 and/or the control of certain food service equipment items 41 by the controller 24 of a particular one of a food service equipment items 41. For example, as shown in FIG. 5, one vacuum pneumatic ice conveyance system 55 may be configured to gather information relevant the ice levels in an ice dispenser 53 and/or combination ice and beverage dispenser 54 through the inter-equipment communication channel 66.

The gathered information may then be utilized for the control, through the intra-equipment communication channel 36, of the vacuum pump controller 34 and ice diverter 35 otherwise related to the controller 26 for the provision of ice to the ice dispenser 53 and/or combination ice and beverage dispenser 54 as necessary. Likewise, a separate vacuum pneumatic ice conveyance system 55 may be controlled through the inter-equipment communication channel 66 for the supplemental provision of ice to the ice dispenser 53 and/or combination ice and beverage dispenser 54.

Figure 6:
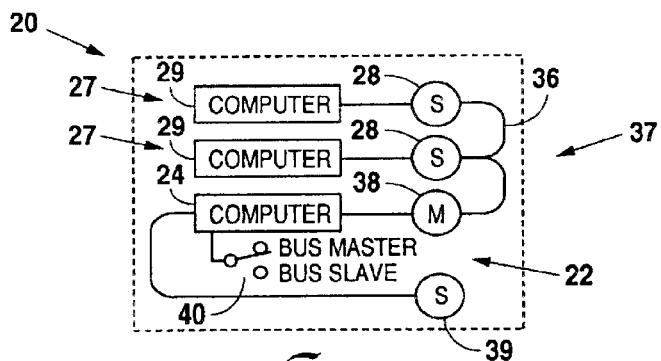
FIG. 6 shows, in a schematic block diagram, an alternative embodiment of the slave-master-slave architecture of the present invention.

Referring now to FIG. 6, an alternative embodiment of the slave-master-slave architecture 37 is shown to generally comprise a master device 22 in control of one or more slave devices 27 as in the previously described embodiment. Likewise, a bus master 38 and a bus slave 39 are also provided as in the previously described embodiment. The alternative embodiment, however, further comprises a logical switch 40 for determination of how the bus master 38 and bus slave 39 are to behave.

Figure 7:
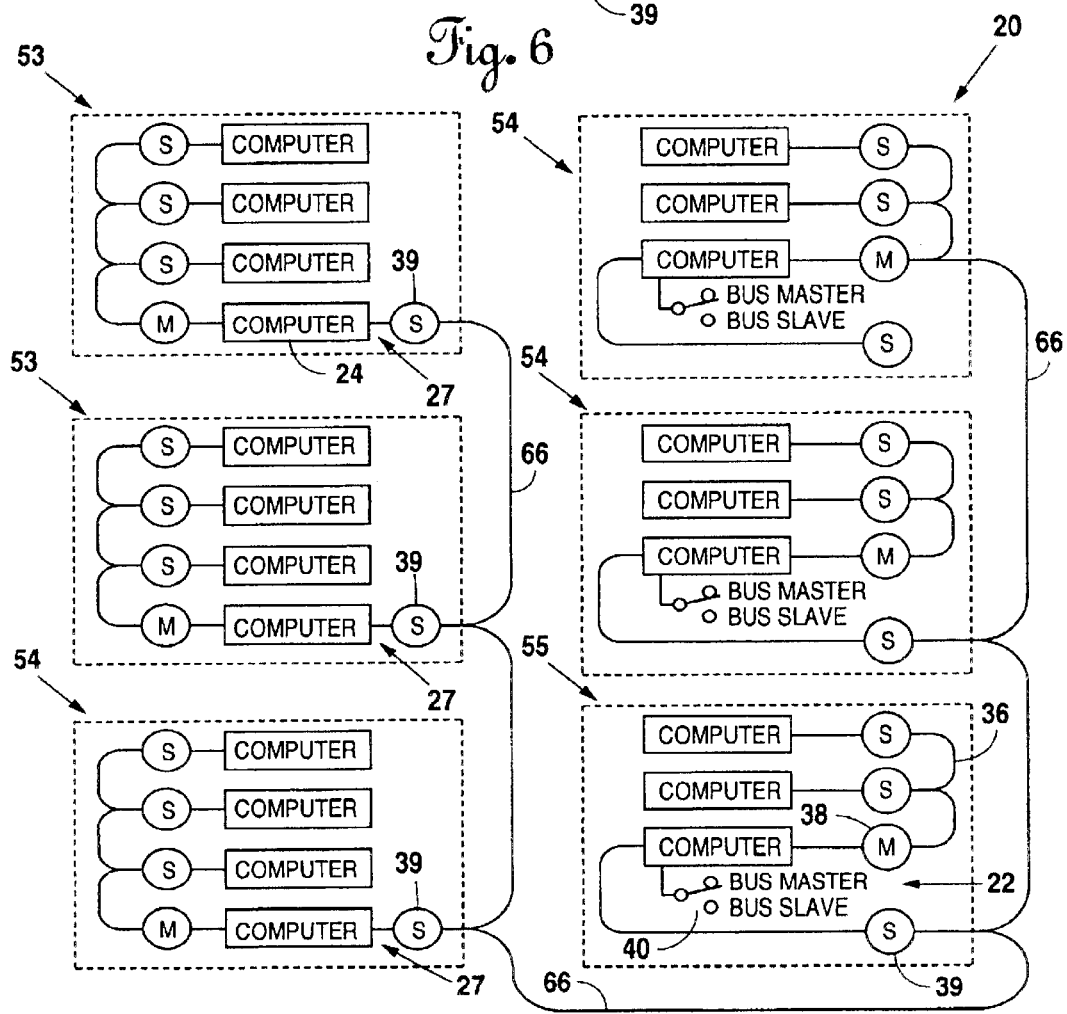
FIG. 7 shows, in a schematic block diagram, a collection of food service equipment items interconnected according to the network topology of the present invention and employing the alternative embodiment of the slave-master-slave architecture.
Figure 8:
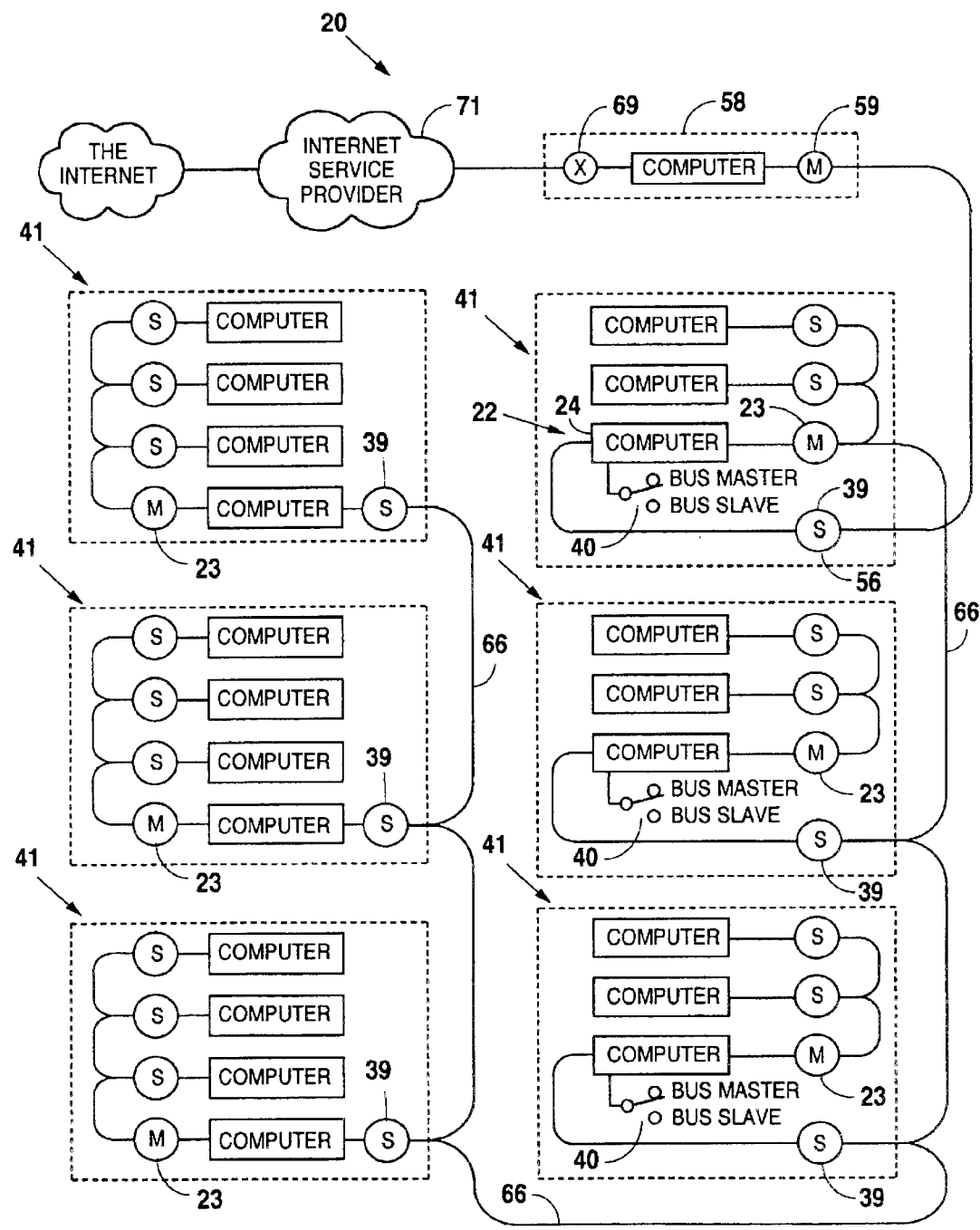
FIG. 8 shows, in a schematic block diagram, a collection of food service equipment items as interconnected one with another and to an external network according to the present invention.
Figure 9:
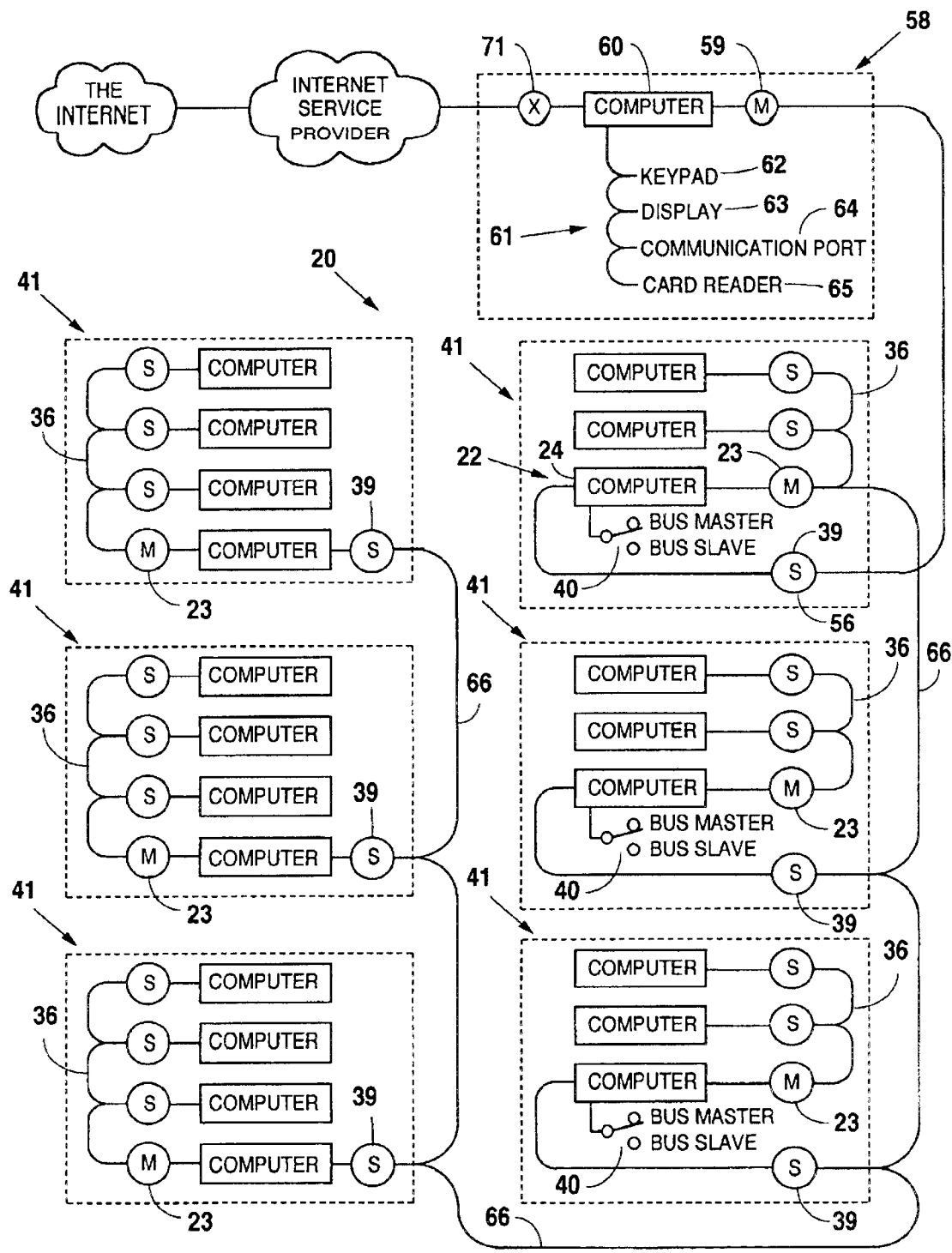
FIG. 9 shows, in a schematic block diagram, an extension of the present invention whereby command, control and information collection functions for the various food service equipment items are directly facilitated through implementation of the present invention.

As shown in FIG. 7, when the logical switch 40 is in the bus slave configuration the bus master 38 and bus slave 39 function just as previously described. As shown in FIG. 8, however, when the logical switch 40 is configured in the bus master position the bus master 38 behaves as previously described while the bus slave 39 takes on the additional capability of providing an equipment interface 56 to a food service equipment local network 57. In particular, the bus slave 39 provides electrical compatibility through a network controller 59 with a network interface 58. As particularly shown in FIG. 8, the network interface 58 may, among other purposes, provide an interface to the Internet 69 such as through an Internet service provider ("ISP") 71.

In at least one embodiment, the network interface 58 may comprise a personal computer 60, which may provide a further user interface 61 for access of management or service personnel to those food service equipment items 41 connected to the food service equipment local network. 57. The user interface 61 may comprise, among other standard interface means, a key pad 62, a display 63, a communication port 64 and/or a card reader 65.

Figure 10:
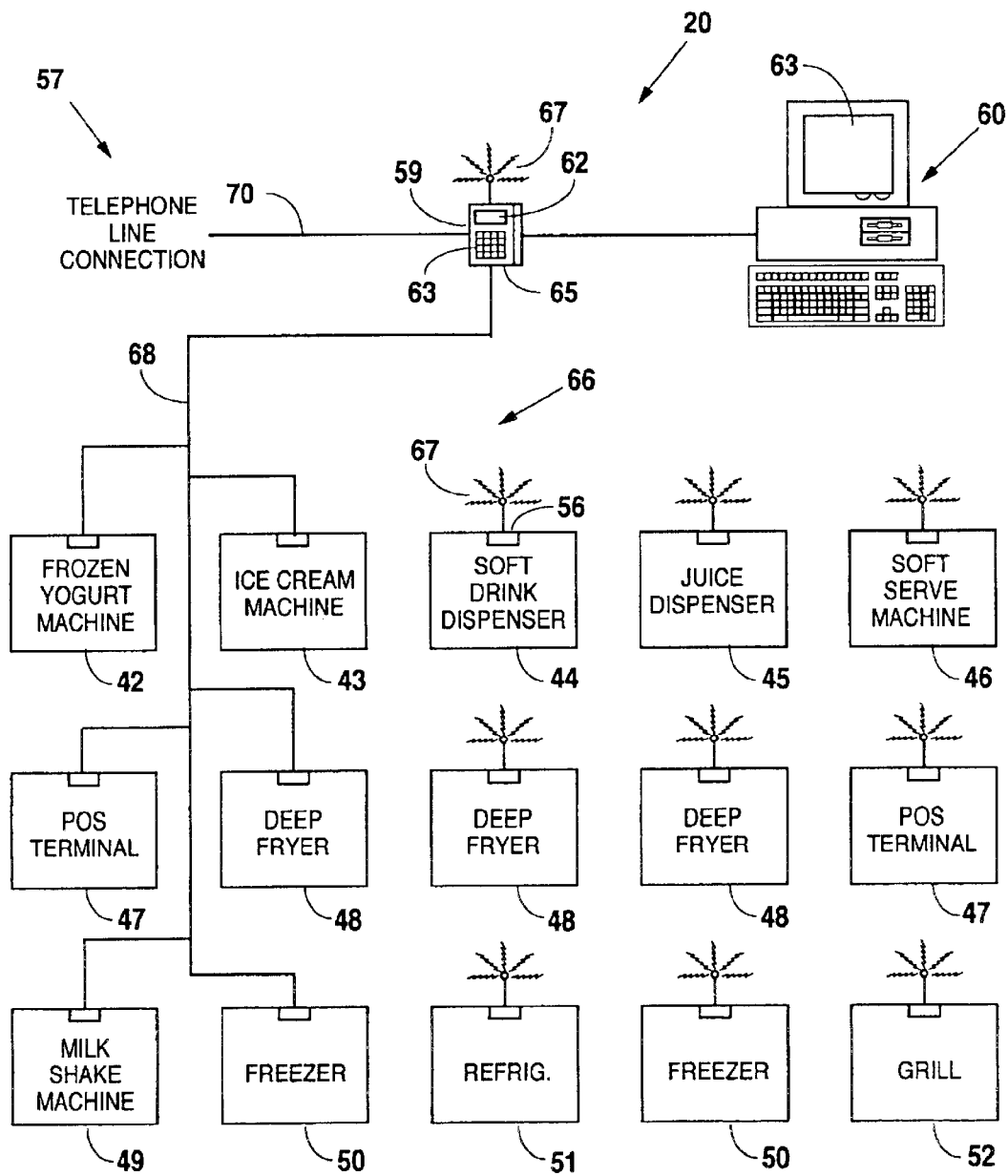
FIG. 10 shows, in a functional block diagram, a hybrid implementation of the present invention.

As shown in FIG. 10, the network controller 59 may also serve as a hub whereby the inter-equipment communication channel 66 may comprise a hybrid physical layer. As shown in the figure, some food service equipment items 41 may be connected to the network controller 59 through various radio frequency ("RF") links 67. This type of connection is particularly advantageous in situations wherein the network topology 20 of the present invention is implemented after an initial equipment installation. On the other hand, as may be more appropriate for new installations, a wired communication bus 68 may be implemented. In the depicted scenario, the network controller 59 may interface for external communication purposes with any food service equipment item 41 configured to have a bus slave 39 act as an equipment interface 56. The network controller 59 may then interface with a personal computer 60 for user access to the food service equipment local network 57 or provide connectivity to an interface to the public switched telephone network 70 or the like.

Figure 11:
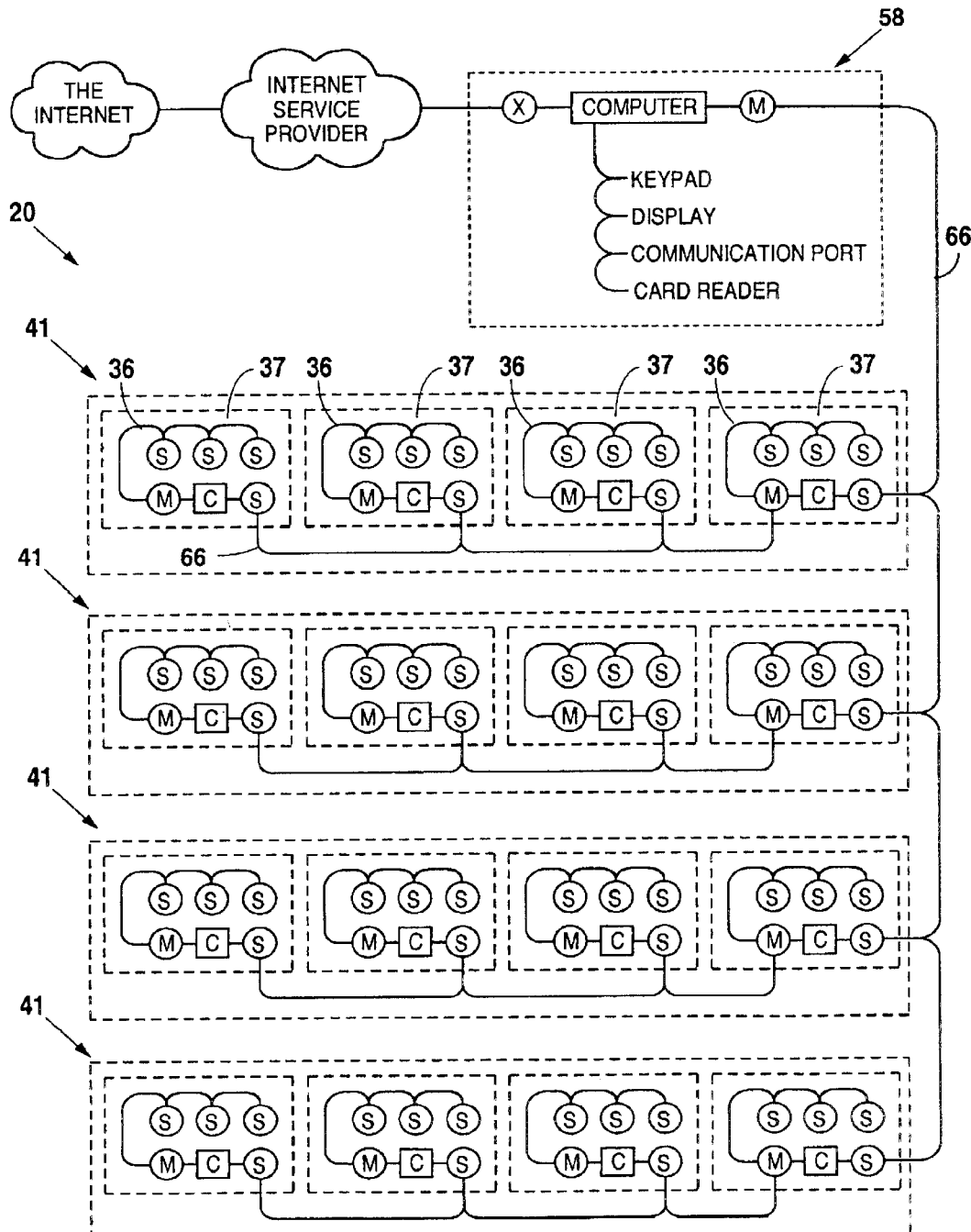
FIG. 11 shows, in a schematic block diagram, an expanded collection of food service equipment items as may be interconnected according to the network topology of the present invention.
Figure 12:
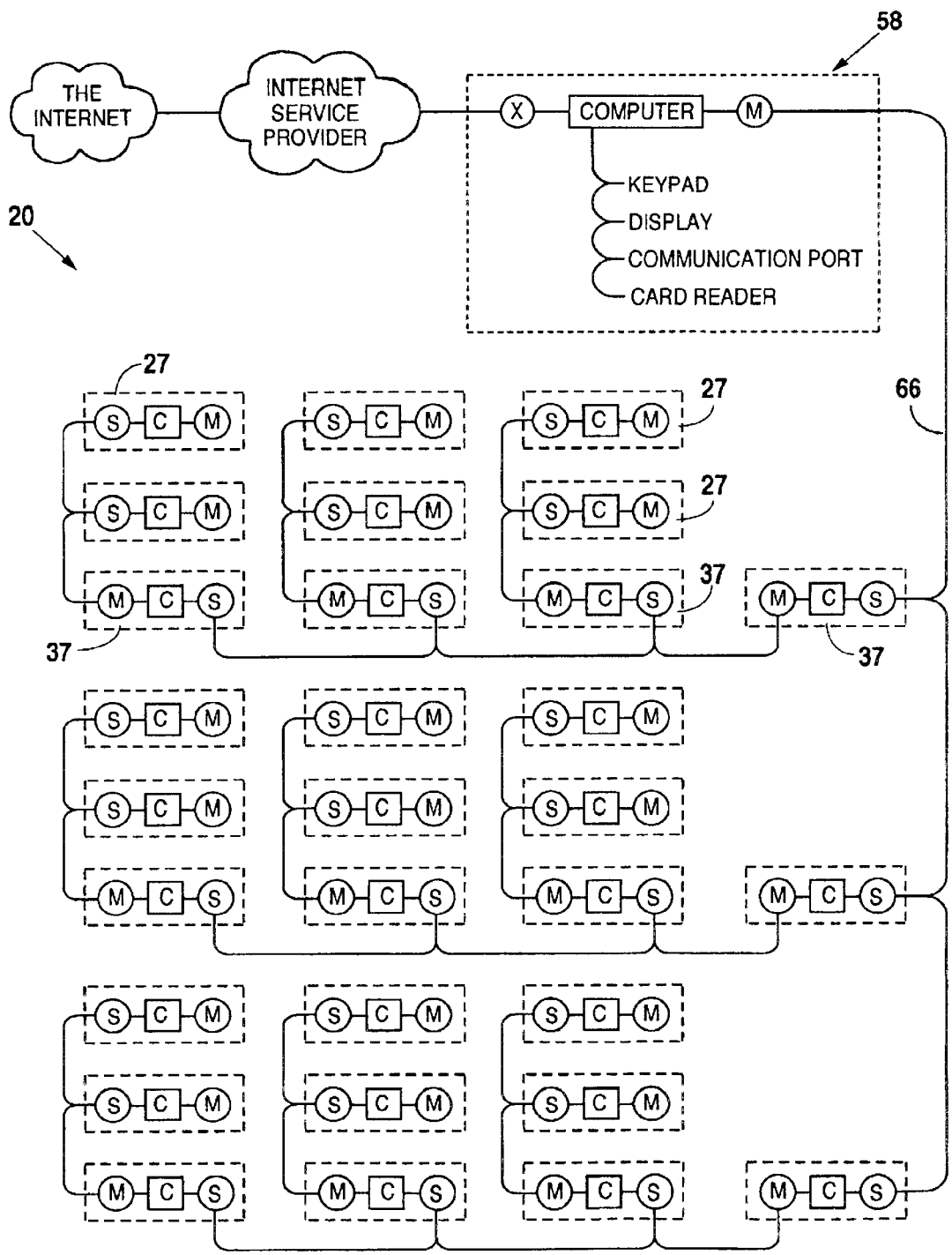
FIG. 12 shows, in a schematic block diagram, an alternative implementation of the present invention for expanded interconnection of various components of food service equipment items.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, as shown in FIGS. 11 and 12, various levels of implementation of the present invention may be effected. In FIG. 11, multiple slave-master-slave architectures 37 are implemented within a plurality of food service equipment service items 41, which in turn are networked to a single network interface 58. On the other hand, in FIG. 12, a plurality of master devices 22 and slave devices 27 are configured through various implementations of the slave-master-slave architectures 37 and in turn connected through the inter-equipment communication channel 66 to a single network interface 58. In any case, because the scope of the present invention is much broader than any particular embodiment, the foregoing detailed description should not be construed as a limitation of the scope of the present invention, which is limited only by the claims appended hereto.

What is claimed is:

1. A network topology for communication within and between food service equipment items, said topology comprising:
    a food service equipment item, said equipment item comprising a controller and at least one functional subsystem configured as a slave to said controller;
    a master interface associated with said controller, said master interface being adapted for electrical communication over an intra-equipment communication channel with a slave interface associated with said functional subsystem; and
    a bus slave interface associated with said controller for communication, external to said food service equipment item, over an inter-equipment communication channel, said bus slave interface being substantially electrically identical to said slave interface.

2. The network topology as recited in claim 1, wherein said food service equipment item comprises a plurality of functional subsystems.

3. The network topology as recited in claim 2, wherein said functional subsystems comprise at least one subsystem selected from the group consisting of:
    an ice link central processing unit;
    a vacuum pump controller; and
    an ice diverter.

4. A network topology for communication within and between food service equipment items, said topology comprising:
    a plurality of food service equipment items, each said equipment item comprising a controller and at least one functional subsystem configured as a slave to said controller;
    a master interface associated with each said controller, each said master interface being adapted for electrical communication within the respective equipment item over an intra-equipment communication channel with a slave interface associated with each said functional subsystem; and
    a bus slave interface associated with each said controller for communication, between said food service equipment items, over an inter-equipment communication channel, each said bus slave interface being substantially electrically identical to each said slave interface.

5. The network topology as recited in claim 4, wherein the inter-equipment communication channel comprises a hardwired bus.

6. The network topology as recited in claim 4, wherein the inter-equipment communication channel comprises a radio frequency ("RF") link.

7. The network topology as recited in claim 6, wherein the inter-equipment communication channel comprises a hybrid interconnection, said hybrid interconnection comprising at least an RF link component and a hardwired bus component.

8. The network topology as recited in claim 7, said network topology further comprising an inter-equipment communication channel, said inter-equipment communication channel being in communication with the master interface of one and only one of said food service equipment items and the said slave interface of at least one other of said food service equipment items.

9. The network topology as recited in claim 8, wherein said inter-equipment communication channel is in communication with a master interface associated with an ice dispenser equipment item and with a slave interface associated with a vacuum pneumatic ice conveyance system.

10. The network topology as recited in claim 8, wherein said inter-equipment communication channel is in communication with a plurality of slave interfaces, each said slave interface being associated with a distinct food service equipment item other than said food service equipment item associated with said master interface.

11. The network topology as recited in claim 8, wherein said inter-equipment communication channel is in communication with a master interface associated with a vacuum pneumatic ice conveyance system and with a plurality of slave interfaces associated with food service equipment items selected from the group consisting of:
    a vacuum pneumatic ice conveyance system;
    an ice dispenser equipment item; and
    a beverage dispenser equipment item.

12. The network topology as recited in claim 9, wherein said inter-equipment communication channel is in communication with a master interface associated with a beverage dispenser equipment item and with a slave interface associated with a source of pressurized gas.

13. The network topology as recited in claim 12, wherein said pressurized gas comprises carbon dioxide.

14. A network topology for communication within and between food service equipment items, said topology comprising:
    a plurality of food service equipment items, each said equipment item comprising a controller and at least one functional subsystem configured as a slave to said controller;
    a master interface associated with a first said controller, said master interface being adapted for electrical communication within the equipment item over an intra-equipment communication channel with a slave interface associated with each said functional subsystem configured as a slave to said first controller;
    a bus slave interface associated with said first controller for communication, external to the food service equipment item, over an inter-equipment communication channel, said bus slave interface being substantially electrically identical to each said slave interface; and
    a logical switch associated with said first controller, said logical switch being adapted to selectively configure said first controller as a master device or a slave device with respect to the inter-equipment communication channel.

15. The network topology as recited in claim 14, wherein said first controller is adapted for communication through said bus slave interface with an external network interface when said first controller is configured through said logical switch as a master device.

16. The network topology as recited in claim 15, wherein said network interface comprises an embedded web server.

17. The network topology as recited in claim 15, wherein said network interface comprises a router.

18. The network topology as recited in claim 15, wherein said network interface comprises a bridge.

19. The network topology as recited in claim 15, wherein said network interface comprises a MODEM.

20. The network topology as recited in claim 15, wherein said network interface comprises a network interface.

21. The network topology as recited in claim 15, wherein said network interface is adapted to interface said food service equipment items, through said first controller, to a wide area network.

22. The network topology as recited in claim 21, wherein said wide area network comprises the Internet.

23. The network topology as recited in claim 22, wherein said network interface is adapted to collect and store information related to the operation of said food service equipment items.

24. The network topology as recited in claim 23, wherein said network interface is adapted to periodically communicate said information related to the operation of said food service equipment items to a remote location.

25. The network topology as recited in claim 24, wherein said network interface further comprises a network controller.

26. The network topology as recited in claim 24, wherein said network interface further comprises a personal computer.

27. The network topology as recited in claim 26, wherein said network interface further comprises a network controller.

* * * * *